Figure 1:
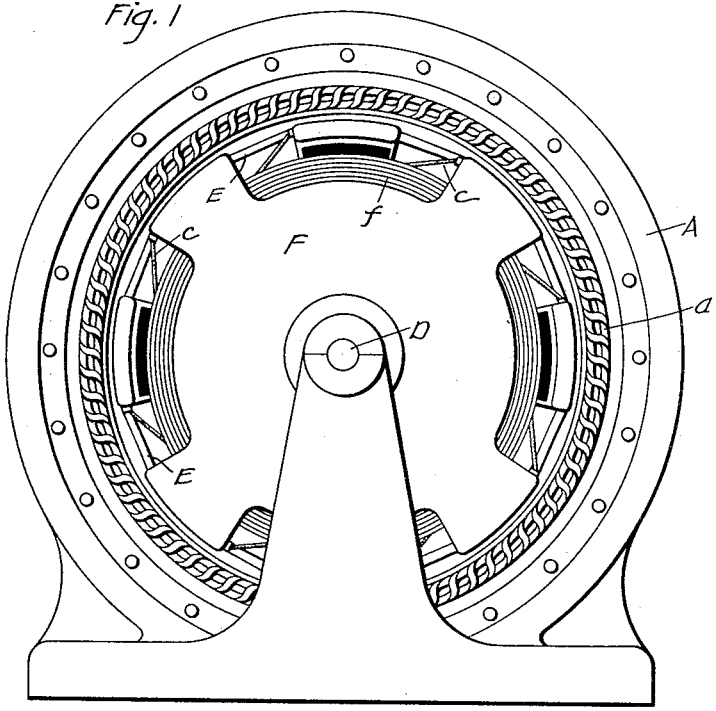

No. 854,749. PATENTED MAY 28, 1907.
C. MACMILLAN.
POWER TRANSMISSION MECHANISM.
APPLICATION FILED DEC. 1, 1905.

2 SHEETS—SHEET 1.

Witnesses:
Murray D. Badgley
Helen Oxford

Inventor:
Campbell Macmillan
By Albert H. Davis
Att'y.

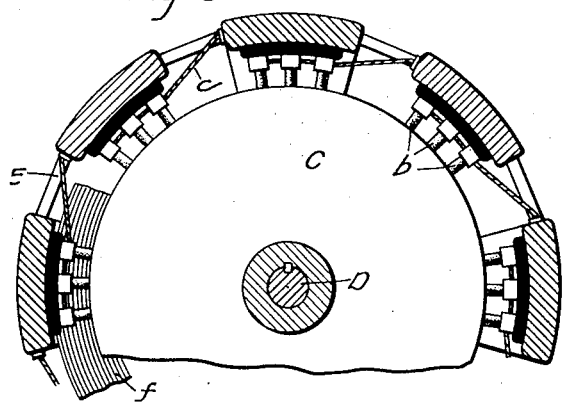
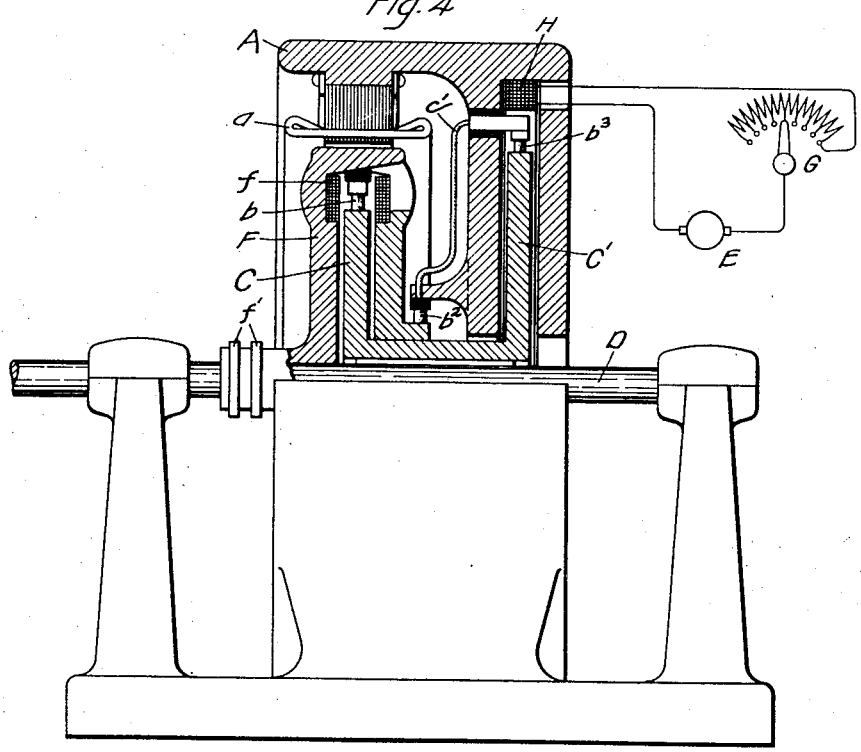

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER-TRANSMISSION MECHANISM.

No. 854,749.  Specification of Letters Patent.  Patented May 28, 1907.

Application filed December 1, 1905. Serial No. 289,930.

*To all whom it may concern:*

Be it known that I, CAMPBELL MACMILLAN, a subject of the King of Great Britain, residing at Schenectady, county of Schenectady, State of New York, have invented certain new and useful Improvements in Power-Transmission Mechanisms, of which the following is a specification.

My invention relates to power-transmission, and is particularly applicable to the transmission of power delivered by a synchronous motor to a load operating at varying speeds. It has been proposed heretofore to employ a direct-current dynamo-electric machine of the commutator type as a slipping magnetic clutch between a constant speed driving member and a variable speed drive member. With such an arrangement, commutation difficulties are likely to arise in large machines with suddenly varying loads or speeds.

Since a unipolar machine requires no commutator, commutation troubles do not arise. Furthermore the revolving element of a unipolar machine may be designed with very small inertia, which is a great advantage in cases when frequent starts with rapid acceleration are required.

My invention in one aspect, accordingly, consists in employing a unipolar machine as a slipping magnetic clutch and utilizing the current generated in the armature to strengthen the field, so that the clutch is automatically compounded for varying loads.

My invention further consists in the combination of a unipolar machine thus arranged with an alternating-current synchronous motor; the unipolar machine serving to transmit the power delivered by the alternating-current motor, and being provided with connections whereby the current induced in the unipolar machine serves to strengthen the field of the synchronous motor. Since the current induced in the unipolar machine is approximately proportional to the load, the synchronous motor may thus be compounded so as to operate with unity power-factor under all loads, or with a leading current at full load, if desired.

My invention further consists in providing a second unipolar machine supplied with current from the first, and arranged to assist in driving the driven member. By means of this arrangement the current induced in the unipolar machine is not all wasted in heat, but a portion of it is transformed into useful work. By varying the relative field-strength of the two machines, the speed and torque ratios between the synchronous motor and the driven member may be varied.

In certain of its aspects my invention is not limited to the employment of a unipolar machine, but instead a direct-current machine of the commutator type may be employed.

Figure 2:
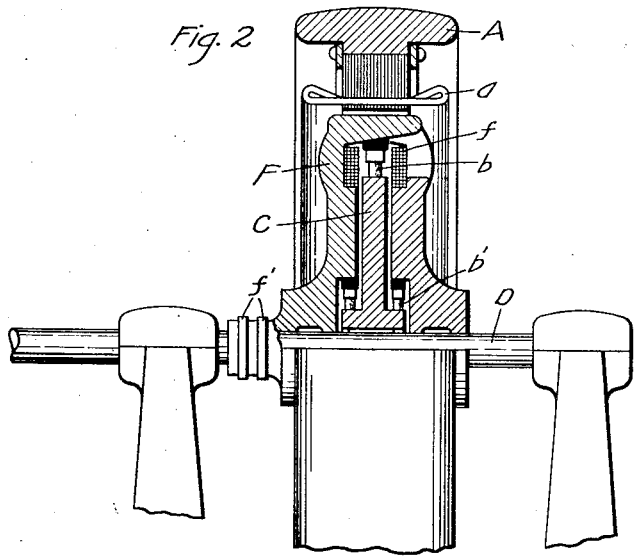

My invention will best be understood by reference to the accompanying drawings, in which Figure 1 shows an end elevation of a synchronous motor provided with power-transmitting mechanism arranged in accordance with my invention; Fig. 2 shows a side elevation, partly in cross-section, of the same; Fig. 3 shows a detail cross-sectional view of the power-transmitting device; and Fig. 4 shows a modified arrangement of the apparatus.

In the drawings A represents the stationary armature of an alternating-current synchronous motor carrying the usual armature coils *a*.

F represents the field of the synchronous motor, which is supported by and freely rotatable on the driven shaft D. The field magnet F consists of two parallel disks of magnetic material, each provided with inwardly extending pole-pieces. The two disks are separate from each other, except for the spacing bars E, shown in Fig. 1, which are made of non-magnetic material, and which hold the poles of the two disks at a proper distance from each other. Each disk carries a magnetizing winding *f*, supplied through collector rings *f'*, which extends circumferentially around the field magnet structure. Between the two disks which form the field magnet F is a disk C of conducting material, and preferably of iron or steel, keyed to the shaft D and forming the armature of a unipolar generator.

It will be seen that the field magnet F not only forms a field magnet for the synchronous motor of the usual type with projecting poles of alternately opposite polarity, but also forms a unipolar field for the conducting disk C. The single field winding *f* serves to produce the magnetization for both the synchronous motor and unipolar generator.

The current induced in conducting disk C by rotation relative thereto of the field magnet F is led off by peripheral brushes $b$, which are electrically connected to the poles of the field magnet F by conductors $c$, as shown in Figs. 1 and 2. The current collected by these brushes passes radially inward through the field magnet F and the brushes $b'$, which bear on the inner portion of the conducting disk C and complete the armature circuit of the unipolar machine, which, as will be seen, is a short-circuit. With this arrangement it will be seen that any relative rotation of the field magnet F and the conducting disk C will induce in the unipolar machine a current which flows in the closed circuit just described, and which tends to oppose the said relative motion,—that is, the unipolar machine acts essentially as a slipping magnetic clutch between the field magnet F and the driven shaft D.

It will further be noticed that the conductors $c$, which convey the current from the peripheral brushes $b$ to the field magnet, extend each in a circumferential direction, so that taken together they form a portion of a complete turn parallel to the field coils $f$. Consequently, the current in these conductors assists the current in the field coils in magnetizing the machine, and since the load on the synchronous motor is substantially proportional to the current induced in the unipolar generator, the magnetizing effect of this induced current may be utilized, as above described, to compound the synchronous motor so as to secure operation at unity power-factor under all loads. The machine may even be over-compounded in this manner, if desired, so as to secure a leading current.

The operation of the power transmission mechanism, as thus far described, is as follows: at starting, the field coil $f$ is deënergized and the field magnet F is brought up to speed, running idle, as an induction motor secondary, by closing the armature circuit of the synchronous motor. When the field F is up to synchronism the circuit of the field winding $f$ would be closed, thereby simultaneously loading the field by inducing currents in the unipolar armature, and furnishing the excitation for locking the field magnet of the synchronous motor firmly in synchronism with the revolving field produced by the armature currents. The load on the synchronous motor is at all times approximately proportional to the current induced in the unipolar armature, and since this current in the conductors $c$ strengthens the field of the synchronous motor, the synchronous motor may be adjusted to operate at substantially unity power-factor. To load on the unipolar machine is greatest at starting. Since at full speed the energy induced in the unipolar is small and since a machine of this type will stand excessive over-loads for a short period, this machine need not be of large capacity, as compared with the synchronous motor. As the driven shaft D speeds up, the voltage induced in the unipolar armature decreases until finally the driven shaft rotates at a speed less than the speed of the field magnet F by an amount just sufficient to induce in the short-circuited unipolar machine the necessary current for transmitting the required torque.

If the load must be started and stopped frequently, the field magnet F would be allowed to run continuously, the load being stopped and started by opening and closing the circuit of the field winding $f$. Since the disk C may be made so thin as to have very small inertia, the power required for frequent starting with high acceleration is comparatively small, and consequently my invention is especially applicable to driving loads requiring frequent and quick starting.

With the arrangement as thus far described, it is evident that the electric energy generated in the unipolar machine is eventually entirely dissipated in heat. In order to improve the efficiency of the device I propose to use the arrangement shown in Fig. 4. In this figure the conducting disk C is extended to form a sleeve keyed to the shaft carrying at its other end a second conducting disk C'. The armature frame A is also extended so as to form a unipolar field structure surrounding the conducting disk C'. A suitable magnetizing winding H may be employed to produce the field for this unipolar machine. Brushes $b^3$ at the periphery of the conducting disk C' are connected by conductors $c'$ to brushes $b^2$ bearing on the inner portion of the field magnet F. The current in the leads from brushes $b^3$ may be extended circumferentially in the manner heretofore described so as to supplement or to replace the magnetization by the winding H, and by adjusting the brush position, this series excitation may be varied.

The circuit of the unipolar machines is as follows: from the conducting disk C outward through the branches $b$ into the field magnet F radially inward through the field magnets, through the brushes $b^2$, through the conductors $c'$, to brushes $b^3$, radially inward through conducting disk C', and back to conducting disk C through the sleeve which joins the two disks. I have shown the field winding H in circuit with a source of separate excitation E, which may be the same source that furnishes the excitation for the synchronous motor. A variable resistance G is also placed in circuit with the field winding H. By means of this variable resistance the relative field-strengths of the two unipolar machines may be varied so as to vary the speed and torque ratios between the synchronous motor and the driven shaft D. Or if the current in the brush leads is used for excitation, the same results may be obtained by shifting the brushes so as to lengthen or shorten the leads. At starting and at low speeds the resistance G would be cut out of circuit, so that the unipolar armature C' would exert a strong torque and produce a relatively high counter-electromotive force, thereby producing a comparatively large slip between the field structure F and the unipolar generator armature C. As the driven shaft D speeds up, the resistance would be cut into circuit until the field cutting the disk C' is reduced practically to zero and the armature C is consequently practically short - circuited. The driven shaft D then rotates substantially at the same speed as the field magnet F as in the arrangement of Fig. 2. It would even be possible to carry this operation further by reversing the terminals of the field coil H, so that the armature C' acts as a generator armature supplying current to the armature C and driving it as a motor. In this way the driven shaft could be caused to operate at a higher speed than that of the field of the synchronous motor. Over the entire range of operation, the energy developed in the unipolar armature C is converted into useful work instead of being wasted in heat, except when the armature C is short circuited at full speed, when the energy developed in the armature is small.

I have illustrated and described one particular arrangement of the unipolar machine and the synchronous motor, it is obvious that the constructions of both machines may be varied, as desired. Accordingly, I do not desire to limit myself to the particular construction and arrangement of parts here shown, but aim in the appended claims to cover all modifications which are within the scope of my invention.

What I claim as new and desire to secure by Letters Patent of the United States, is:

1. In combination with a driving member and a driven member, a unipolar generator having its field magnet carried by one of said members and its armature carried by the other member, brushes carried by said field magnet for collecting the armature current and brush leads extending in a circumferential direction, whereby the current in said leads assists in magnetizing said field magnet.

2. In combination with a driving member and a driven member, a unipolar generator having its field magnet carried by one of said members and its armature carried by the other member, current collecting means for transferring the armature current to the field magnet, and conductors in circuit with said collecting means extending in a circumferential direction.

3. In combination with a driving member and a driven member, a unipolar generator having its field magnet carried by one of said members and its armature carried by the other member, a second unipolar machine comprising a field and armature one carried by one of said members and the other stationary, and connections for supplying to said second machine the current induced in the first unipolar machine.

4. In combination with a driving member and a driven member, a unipolar generator having its field magnet carried by one of said members and its armature carried by the other member, and connections whereby the induced armature current assists in magnetizing the field magnet.

5. In combination with a driving member and a driven member, a unipolar generator having its field magnet carried by one of said members and its armature carried by the other member, a second unipolar machine comprising a field and armature one carried by one of said members and the other stationary, connections for supplying to said second machine the current induced in the field unipolar machine, and connections whereby said induced current assists in magnetizing one of said machines.

6. In combination with a driving member and a driven member, a unipolar generator having its field magnet carried by one of said members and its armature carried by the other member, a second unipolar machine comprising a field and armature one carried by one of said members and the other stationary, connections for supplying to said second machine the current induced in the first unipolar machine, and means for varying the relative field strengths of the two unipolar machines.

7. In combination with an alternating-current synchronous motor, a driven member, a direct-current generator comprising field and armature, one carried by the rotatable member of said motor and the other by said driven member, and connections whereby the current induced in said generator strengthens the field of said motor.

8. In combination with an alternating-current synchronous motor, a driven member, a direct-current generator comprising field and armature one carried by the rotatable member of said motor and the other by said driven member, and a second direct-current machine supplied with current from the first direct-current machine and arranged to assist in driving said driven member.

9. In combination with an alternating-current synchronous motor, a driven member, a direct-current generator comprising field and armature one carried by the rotatable member of said motor and the other by said driven member, a second direct-current machine supplied with current from the first direct-current machine and arranged to assist in driving said driven member, and connections whereby said current strengthens the field of said synchronous motor.

10. In combination with an alternating-current synchronous motor, a driven member, a direct-current generator comprising field and armature one carried by the rotatable member of said motor and the other by said driven member, a second direct-current machine supplied with current from the first direct-current machine and arranged to assist in driving said driven member, and means for varying the relative field strengths of the two direct-current machines.

11. In combination with an alternating-current synchronous motor, a driven member, a unipolar generator comprising field and armature one carried by the rotatable member of said motor and the other by said driven member, and connections whereby the current induced in said unipolar generator strengthens the field of said synchronous motor.

12. In combination with an alternating-current synchronous motor excited by a circumferentially extending field coil, a driven member, a unipolar generator comprising field and armature one carried by the rotatable member of said motor and the other by said driven member, current-collecting means for transferring the armature current of the unipolar generator to the field magnet, and conductors in circuit with said collecting means extending in a circumferential direction.

13. In combination with an alternating-current synchronous motor, a driven member, a unipolar generator comprising field and armature one carried by the rotatable member of said motor and the other by said driven member, and a second unipolar machine supplied with current from the first unipolar machine and arranged to assist in driving said driven member.

14. In combination with an alternating-current synchronous motor, a driven member, a unipolar generator comprising field and armature one carried by the rotatable member of said motor and the other by said driven member, a second unipolar machine supplied with current from the first unipolar machine and arranged to assist in driving said driven member, and means for varying the relative field strengths of the two unipolar machines.

15. In combination with a driven member, an alternating-current synchronous motor and a direct-current generator, one member of one machine being stationary and one member of the other machine being carried by said driven member, an intermediate member comprising the other members of both machines and rotatable both with respect to the stationary member and to the driven member, and connections whereby the current induced in the direct-current generator strengthens the field of the synchronous motor.

16. In combination with a driven member, an alternating current synchronous motor and a direct-current generator, one member of one machine being stationary and one member of the other machine being carried by said driven member, an intermediate member comprising the other members of both machines and rotatable both with respect to the stationary member and to the driven member, and a second direct-current machine supplied with current from the direct-current generator and arranged to assist in driving said driven member.

17. In combination with a driven member, an alternating-current synchronous motor and a direct-current generator, one member of one machine being stationary and one member of the other machine being carried by said driven member, an intermediate member comprising the other members of both machines and rotatable both with respect to the stationary member and to the driven member, a second direct-current machine supplied with current from the direct-current generator and arranged to assist in driving said driven member, and means for varying the relative field strengths of the two direct-current machines.

18. In combination with a driven member, an alternating-current synchronous motor and a unipolar generator, one member of one machine being stationary and one member of the other machine being carried by said driven member, and an intermediate member comprising the other members of both machines and rotatable both with respect to the stationary member and to the driven member.

19. In combination with a driven member, an alternating-current synchronous motor and a unipolar generator, one member of one machine being stationary and one member of the other machine being carried by said driven member, an intermediate member comprising the other members of both machines and rotatable both with respect to the stationary member and to the driven member, and connections whereby the current induced in the unipolar generator strengthens the field of the synchronous motor.

20. In combination with a driven member, an alternating-current synchronous motor and a unipolar generator, one member of one machine being stationary and one member of the other machine being carried by said driven member, an intermediate member comprising the other members of both machines and rotatable both with respect to the stationary member and to the driven member, and a second unipolar machine supplied with current from the unipolar generator and arranged to assist in driving the driven member.

21. In combination with a driven member, an alternating-current synchronous motor and a unipolar generator, one member of one machine being stationary and one member of the other machine being carried by said driven member, an intermediate member comprising the other members of both machines and rotatable both with respect to the stationary member and to the driven member, a second unipolar machine supplied with current from the unipolar generator and arranged to assist in driving the driven member, and means for varying the relative field strengths of the two unipolar machines.

22. In combination with an alternating-current synchronous motor, a driven member, and a unipolar generator comprising field and armature, one carried by the rotatable member of the synchronous motor and the other by said driven member.

23. In combination with a driven member, an alternating-current synchronous motor and a unipolar generator, the armature of one machine being stationary and the armature of the other machine being carried by said driven member, and an intermediate member comprising the fields of both machines rotatable with respect to both armatures.

24. In combination with a driven member, an alternating-current synchronous motor and a unipolar generator, the armature of one machine being stationary and the armature of the other machine being carried by said driven member, an intermediate member comprising the fields of both machines rotatable with respect to both armatures, and a single magnetizing winding for both fields.

25. In combination with a driven member, an alternating-current synchronous motor and a unipolar generator, the armature of one machine being stationary and the armature of the other machine being carried by said driven member, and an intermediate member comprising the fields of both machines rotatable with respect to both armatures, a single magnetizing winding for both fields, and connections whereby the current induced in the armature of said unipolar machine strengthens said fields.

26. In combination with a driven member, an alternating-current synchronous motor and a unipolar generator, the armature of one machine being stationary and the armature of the other machine being carried by said driven member, an intermediate member comprising the fields of both machines rotatable with respect to both armatures, and a circumferentially extending magnetizing coil for both fields.

27. In combination with a driven member, an alternating-current synchronous motor and a unipolar generator, the armature of one machine being stationary and the armature of the other machine being carried by said driven member, an intermediate member comprising the fields of both machines rotatable with respect to both armatures, a circumferentially extending magnetizing coil for both fields, means for collecting the current from the armature of said unipolar machine, and conductors in series with said collecting means extending in a circumferential direction.

In witness whereof I have hereunto set my hand this 29th day of November, 1905.

CAMPBELL MACMILLAN

Witnesses:
BENJAMIN B. HULL,
HELEN ORFORD.